(12) United States Patent
Shaw et al.

(10) Patent No.: X6823
(45) Date of Patent: Nov. 3, 1831

(54) AXES

(76) Inventors: Erastus Shaw; Robert Henry Burk

Erastus Shaw & Robert Henry Burk.

The schedule referred to in these Letters Patent and making part of the same containing a description in the words of the said Erastus Shaw and Robert Henry Burk themselves, of their Improvement in the manufacture of Axes.

---

This improvement consists in part in an application of the principle of the common rolling or plating mill, to the manufacture of axes.

Our mode of applying this principle is as follows viz.

A Mill constructed in the usual form, of sufficient size and strength is prepared. One of the rollers is indented to the proper depth, in the form of the head part of the axe, and on the other is raised a like form, and the rollers are attached to each other by gearing, in such manner as that the raised part fits into the indented part as the rollers revolve leaving a space between the surface of the raised part, and the bottom of the indented part, of the required thickness. Some sufficient power is attached to the rollers and a suitable piece of metal raised to the proper heat is applied, either immediately from the tongs or laid upon a suitable carriage, ..... The Mill in its revolution presses the metal into the various angles of the indentation, thus giving it the desired form. When the metal is formed in this manner it is conveyed to another part of the machine to be bent +, doubled together to form the poll and eye of the axe. This is effected by placing the thick part which is to form the poll, directly over the mortise or indentation of the proper form. A punch or follower is then forced by levers or otherwise down upon it, which raises up the two thin parts, doubling them partially together. The punch is then withdrawn and the operation completed by two slides moving laterally in an opposite direction to each other, coming in contact with the two sides, forcing them together.

What we claim as our invention is the principle of forming the parts of axes mentioned above in this specification, by means of rollers, and of, doubling them together when formed, in a press, claiming the particular form of machinery used to carry these principles into operation as unessential.

Witnesses

Leo L Rogers

Jedediah S Lewis

Erastus Shaw,

Robert Henry Park (436 words)

Patented November 3rd 1891.